United States Patent
Zhang et al.

(10) Patent No.: US 11,259,552 B2
(45) Date of Patent: Mar. 1, 2022

(54) CHIPS FORMED BY SLICING WITH APPLE CELL CLEAN WATER JET SCALPEL AND DIFFERENTIAL TEMPERATURE COMBINED WITH DIFFERENTIAL PRESSURE PUFFING AND PROCESSING TECHNOLOGY

(71) Applicant: SHANXI SDIC ZHONGLU FRUIT JUICE CO., LTD., Beijing (CN)

(72) Inventors: Jiming Zhang, Beijing (CN); Chuanzhu Leng, Beijing (CN); Xihong Li, Beijing (CN); Gang Xin, Beijing (CN); Xinfei Song, Beijing (CN); Baoshuang Tian, Beijing (CN); Nan Jiang, Beijing (CN); Qingfei Cao, Beijing (CN); Rui Huang, Beijing (CN); Xiaotong Chen, Beijing (CN); Qingshan Zhang, Beijing (CN); Xiangyang Zheng, Weihai (CN)

(73) Assignee: SHANXI SDIC ZHONGLU FRUIT JUICE CO., LTD., Beijing (CN)

( * ) Notice: Subject to any disclaimer, the term of this patent is extended or adjusted under 35 U.S.C. 154(b) by 0 days.

(21) Appl. No.: 17/079,500

(22) Filed: Oct. 25, 2020

(65) Prior Publication Data
US 2021/0120852 A1  Apr. 29, 2021

(51) Int. Cl.
*A23L 19/00* (2016.01)
*A23P 30/32* (2016.01)
(Continued)

(52) U.S. Cl.
CPC .............. *A23L 19/03* (2016.08); *A23B 7/022* (2013.01); *A23B 7/155* (2013.01); *A23P 30/32* (2016.08); *B26F 3/004* (2013.01); *A23V 2002/00* (2013.01)

(58) Field of Classification Search
CPC ....................................................... A23B 7/155
See application file for complete search history.

(56) References Cited

U.S. PATENT DOCUMENTS

| | | | | |
|---|---|---|---|---|
| 2,110,184 A | * | 3/1938 | Webb | ..................... A23P 30/32 426/447 |
| 4,764,371 A | * | 8/1988 | Pusey | ..................... A01N 63/00 424/93.462 |

(Continued)

FOREIGN PATENT DOCUMENTS

| CN | 107212337 A | 9/2017 |
|---|---|---|
| CN | 110432457 A | 11/2019 |

OTHER PUBLICATIONS

Jiang Li CN 102370032 Mar. 14, 2012 Derwent Abstract pp. 1-2 (Year: 2012).*

(Continued)

*Primary Examiner* — Felicia C Turner

(57) ABSTRACT

The disclosure provides chips formed by slicing with an apple cell clean water jet scalpel and a processing technology. The processing technology comprises the following specific steps: harvesting fresh fruits, sorting, peeling, slicing, drying and packaging to obtain the apple crispy chip. According to the disclosure, the tangxin apple is peeled by adopting an ultrahigh pressure water jet flow cutting technology, cut into slices with a thickness of 5 mm and inoculated for 15 min in 30° C. and 30% *Lactobacillus brevis* fermentation broth. PPO is a terminal oxidase with $Cu^{2+}$ as a prosthetic group, and *Lactobacillus brevis* and *Lactobacillus plantarum* are complexed with $Cu^{2+}$, leading to rapid oxygen consumption to generate organic acid and $CO_2$, quickly reduction of pH and creation of an approximate oxygen-free environment to effectively inhibit PPO (Continued)

activity while removing oxygen required in enzymatic browning, thereby effectively inhibiting browning.

3 Claims, 1 Drawing Sheet

(51) Int. Cl.
*A23B 7/022* (2006.01)
*A23B 7/155* (2006.01)
*B26F 3/00* (2006.01)

(56) References Cited

U.S. PATENT DOCUMENTS

| | | | |
|---|---|---|---|
| 5,047,239 A | * | 9/1991 | Pusey .................... A23B 7/155 424/93.462 |
| 9,510,605 B2 | | 12/2016 | Melnyczuk |
| 2003/0177879 A1 | * | 9/2003 | Abarzuza ................ A23N 15/12 83/53 |
| 2004/0241311 A1 | * | 12/2004 | Baianu .................... A23B 9/04 426/615 |
| 2006/0013925 A1 | * | 1/2006 | Bauman .................. A23B 7/16 426/102 |
| 2008/0182003 A1 | | 7/2008 | Baker et al. |
| 2009/0304865 A1 | * | 12/2009 | Ashourian .............. A23L 19/09 426/50 |
| 2019/0350250 A1 | | 11/2019 | Kui et al. |

OTHER PUBLICATIONS

Woo KR20070013654A Jan. 31, 2007 Derwent Abstract pp. 1-2 (Year: 2007).*
Lv et al. CN 102894303 Derwent Abstract 2012 (Year: 2012).*
Lin et al. Derwent Abstract of CN 104222890 Sep. 12, 2014 (Year: 2014).*

* cited by examiner

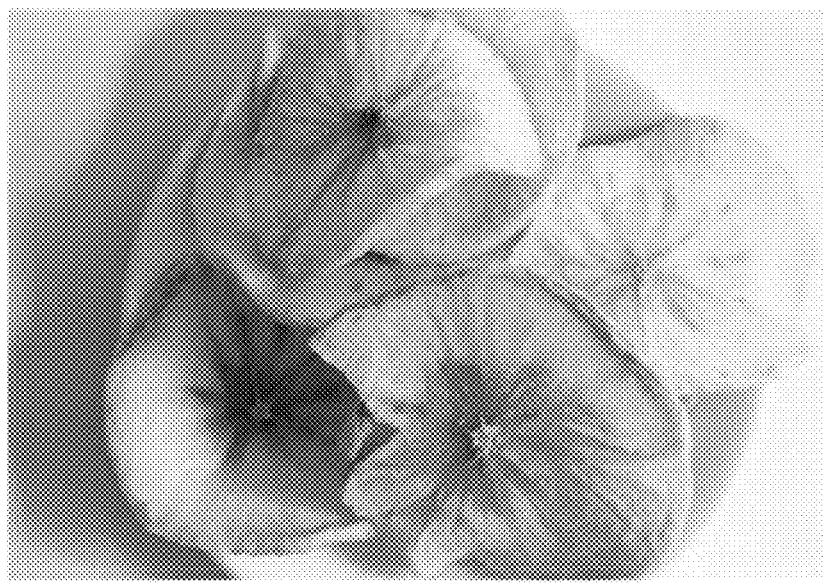

CHIPS FORMED BY SLICING WITH APPLE CELL CLEAN WATER JET SCALPEL AND DIFFERENTIAL TEMPERATURE COMBINED WITH DIFFERENTIAL PRESSURE PUFFING AND PROCESSING TECHNOLOGY

CROSS-REFERENCE TO RELATED APPLICATIONS

This application claims priority to Chinese Patent Application No. 201911020595.6 with a filing date of Oct. 25, 2019. The content of the aforementioned applications, including any intervening amendments thereto, are incorporated herein by reference.

TECHNICAL FIELD

The disclosure relates to the field of crispy chips, and particularly to chips formed by slicing with an apple cell clean water jet scalpel and differential temperature combined with differential pressure puffing and a processing technology.

BACKGROUND OF THE PRESENT INVENTION

In Aksu area of Xinjiang, the differential temperature between day and night is large, the light is sufficient and thus the tangxin apples are high in sugar content. Furthermore, most of them are irrigated by glacial snow water, are sweet and mellow in taste, juicy and free of residues, and rich in nutrition. But because of transportation and dull of sale, a lot of tangxin apples are rotted due to dull of sale at a heavy cost. Apple chips can keep nutritional ingredients, has crispy taste, full shape and even puffing, and can meet the needs of consumers on food nutrition, convenience, nature, low fat and high dietary fiber of apple chips. However, there are still some problems in our country's fruit and vegetable crispy chips.

1. Use of a frying and dehydration technology requires to keep the products away from light and moisture, but some of them are sold in transparent bottles, which results in short shelf life, easy fading and deterioration.

2. In the apple cutting process, cell fluid outwardly flows because cell tissues are damaged, phenols are oxidized to form quinones in the presence of oxidase. The polycondensation of quinones and their combination with other substances produce black or brown pigment precipitates to generate browning while producing bad flavor and nutrient loss.

3 The tangxin apple is high in sugar content, and the slices are easily agglomerated, adhered and absorb moisture in the process of drying, resulting in poor product quality.

4. The freeze-drying technology in the processing takes a long time and is high in cost, and is not suitable for processing a large amount of crispy chips like apples; the spray drying technology requires high temperature, the drying process can affect the stability of product components and ingredient substances and ingredients, and nutritional substances can be lost.

Upon retrieval, it is found that the patent documents related to the present application are disclosed as follows:

1. A method for making non-fried puffed Hanfu apple chips (CN 104872564 A). This patent has the following disadvantages: ① when slicing, the blade directly cuts, and the cell fluid inside the apple flows out, which very easily breeds pathogenic bacteria; ② in the stage of boiling sugar, the activity of enzyme that is prone to browning is destroyed, and meanwhile the activity of defense enzymes such as SOD is destroyed; ③ the hot air drying takes a long time and the composition change of the apple slices in the process of drying is not well controlled.

2. A method for rapidly preparing a puffing-free low-sugar freeze-dried fruit crispy chip (CN 101433300A) has the disadvantages: ① when slicing, the blade directly cuts, the cell fluid inside the apple outwardly flows, which easily breeds pathogen; ② the selected low-sugar fruit is prone to browning after being in contact with oxygen; in the microwave drying stage, the puffing degree is not stable, which has the possibility of puffing fruit crispy chips; ③ the freeze-drying means in the sublimation drying stage has large energy consumption, which increases the cost of crispy chips;

3. A preparation method of freeze-dried siraitia grosvenorii fruit (CN 102224838 A) has the disadvantages: ① during the preservation period of the whole fruit, due to punching on the fruit, pathogens is easily brought and difficult to control; ② in the heating process, heating is performed in sections and is too frequent, which increases the tedious process and is not conducive to batch production. ③ Vacuum freeze-drying has a long time and large energy consumption. Although the drying of the whole Siraitia grosvenorii fruit is preserved, the cost of Siraitia grosvenorii is increased.

SUMMARY OF PRESENT INVENTION

The object of the disclosure is to overcome the shortages of the prior art to provide a non-fried apple crispy chip which is good in browning prevention effect and high in drying efficiency, and a processing method thereof.

The technical solution of the disclosure is achieved as follows:

Chips formed by slicing with an apple cell clean water jet scalpel and differential temperature combined with differential pressure puffing and a processing technology, the processing technology comprising the following process steps:

(1) sorting, washing and peeling: screening fresh and high-quality tangxin apples without disease and pest infringement and mechanical injury and with substantially the same fruit maturity, washing and peeling;

(2) slicing: cutting the apple into slices with a thickness of 5 mm by using an ultrahigh pressure water jet cutting technology;

(3) antisepsis: spraying crispy apple chips with *Bacillus subtilis* antimicrobial peptide solution, aired for 5 min and dried for 0.5 h in 40° C. hot air;

(4) drying: soaking the apple slices 10 min with 5-10 wt % maltodextrin solution before drying, draining and then drying with a pulse plate vacuum drying machine;

(5) differential pressure puffing after drying: controlling the vacuumizing temperature to 105° C. for 30 min for the first time after puffing for 15 min, and packaging after puffing is ended to obtain apple crispy chips.

Furthermore, the two sides of the slice are soaked for 15 min in 30° C., 30% *Lactobacillus brevis* fermentation broth.

Furthermore, the concentration of the *Bacillus subtilis* antimicrobial peptide solution is 1.2 g/L.

Furthermore, the apple chip is uniformly sprayed with 1.2 g/L *Bacillus subtilis* antimicrobial peptide solution.

Furthermore, the frequency of vacuumizing combined RF is 30 MHz, the RF power is 5 kW pulse, the heating temperature is 45° C., and the intermittent alternating time is 2 min.

The disclosure has the advantages and beneficial effects:

1. The tangxin apple is peeled by the ultrahigh pressure water jet cutting technology, cut into slices with a thickness of 5 mm, inoculated for 15 min in 30° C. and 30% *Lactobacillus brevis* fermentation broth, and the PPO is a terminal oxidase with $Cu^{2+}$ as a prosthetic group, *Lactobacillus brevis* and *Lactobacillus plantarum* complex $Cu^{2+}$, which can rapidly consume oxygen to produce organic acid and $CO_2$, quickly reduce pH and create a nearly oxygen-free environment, effectively inhibit PPO activity while removing oxygen required in enzymatic browning, thus effectively inhibiting browning.

At the same time, the brought *Lactobacillus brevis* can also produce multiple antibiotics and bacteriocins to inhibit microorganisms, and multiple functional substances so that the apple crispy chips have higher nutritional value.

2. Heating is performed by adopting the RF-pulse vacuum dehumidification plate pre-drying combined with differential pressure puffing method, the vacuum environment reduces the enzyme activity, and the product quality is not affected. The pulse radio frequency is great in penetration capability and uniform in heating. At the same time, addition of maltodextrin can effectively solve the problem of adhesion in the drying process due to the high content of sugar in apple slices, improve the retention and uniformity of nutritional ingredients in the dried products, and significantly shorten the drying time by about 50%. When the differential puffing operation temperature is too low, the puffing degree is low, and the appearance and crispness of apple chips are poor. When the operation temperature is too high, burnt easily occurs. The combination of the two methods can overcome the problems of "hard core" and "coking" caused by RF pulse-differential pressure puffing.

3. In the disclosure, *Bacillus subtilis* antimicrobial peptide is adopted for bacteriostasis and antisepsis, the apple chips are uniformly sprayed with 1.2 g/L *Bacillus subtilis* antimicrobial peptide solution, aired for 5 min and dried for 0.5 h under the 40° C. hot air, and the natural microbial preservative is wide in antibacterial spectrum, short in production cycle and non-toxic, and can effectively perform bacteriostasis and antisepsis.

DESCRIPTION OF THE DRAWINGS

FIG. 1 is a picture of an apple chip prepared according to the disclosure.

DETAILED DESCRIPTION OF PREFERRED EMBODIMENTS

Next, the disclosure will be further described in detail through embodiments. The following embodiments are only destructive but not limiting, and cannot limit the protective scope of the disclosure.

Provide are chips formed by slicing with apple cell clean water jet scalpel and differential temperature combined with differential pressure puffing and a processing technology, the processing technology comprising the following process steps:

20-300 parts of tangxin apple, 3-5 parts of maltodextrin (maltodextrin is used in the drying step, adhesion easily occurs in the process of drying because the high sugar content of tangxin apple easily causes adhesion for the purpose of preventing adhesion).

The technological process is as follows: harvesting fresh fruits, sorting, peeling, slicing, drying and packaging to obtain apple crispy chips.

The operation method comprises the specific steps:

(1) sorting: screening fresh and high-quality tangxin apples without disease and pest infringement and mechanical injury and with substantially the same fruit maturity;

(2) washing and peeling: washing away the soil on the surface of apple under the running tap water, wiping water drops, and peeling off the skin, wherein the thicknesses of the peeled skins are consistent.

(3) Slicing: cutting the apple into slices with a thickness of 5 mm by using an ultrahigh pressure water jet cutting technology. The cell integrity is maintained so that nutrition is not lost, and the peeled skin is washed and ground utilizing high pressure water while cutting. The two sides of the slice are soaked for 15 min in 30° C. and 30% *Lactobacillus brevis* fermentation broth, so as to effectively inhibit PPO activity while removing oxygen required in enzymatic browning, thereby effectively inhibiting browning.

(4) antisepsis: spraying apple crispy chips with *Bacillus subtilis* antimicrobial peptide solution, aired for 5 min and dried for 0.5 h in 40° C. hot air;

(5) drying: soaking the apple slices with 5-10 wt % maltodextrin solution for 10 min before drying, draining and then drying with a pulse plate vacuum drying machine; the frequency of vacuumizing combined RF is 30 MHz, the RF power is 5 kW pulse, the heating temperature is 45° C., and the intermittent alternating time is 2 min.

(6) differential pressure puffing after drying: controlling the vacuumizing temperature to 105° C. for 30 min for the first time after puffing for 15 min, and packaging after puffing is ended to obtain apple crispy chips.

Antisepsis in step (4) is performed by spraying *Bacillus subtilis* antibacterial peptide solution, infestation of pathogenic bacteria during the shelf life can be avoided by utilizing the bacteriostasis function.

In the slicing process in step (3), membrane filtrate of *Lactobacillus brevis* and *Lactobacillus plantarum* is used for soaking, it complexes metal ions to rapidly consume oxygen, inhibit polyphenol oxidase PPO activity and effectively inhibit browning; meanwhile, a large number of organic acids, $CO_2$, antibiotics and bacteriocins are produced to avoid microbial infestation;

The drying in step (5) is performed by using an RF-pulse vacuum dehumidification plate pre-drying combined with differential pressure puffing technology. Pulse radio frequency is large in penetration capability and uniform in heating, and meanwhile addition of maltodextrin can effectively solve the problem that apple slices are adhered in the process of drying due to high sugar content, improve the retention and uniformity of nutritional ingredients in dried products, and also can significantly shorten the drying time by about 50%. When the differential pressure puffing operation temperature is too low, the puffing degree is low. The appearance and crispness of apple chips are poor. When the operation temperature is too high, burnt easily occurs. The combination of the two methods can overcome the problems of "hard core" and "coking" caused by RF-pulse and differential pressure puffing.

By using the RF-pulse vacuum dehumidification plate pre-drying combined with differential pressure puffing technology, the retention and uniformity of nutritional ingredients in the dried products can be improved, and the drying time can also be significantly shortened by about 50%.

The principle of the above technology is described as follows:

1. High-Antioxidation *Lactobacillus* Complexed $Cu^{2+}$ Browning Inhibition Technology.

*Lactobacillus brevis*, culture preservation No.: CGMCC 8970, an aerobic type strain, which can rapidly consume surrounding oxygen and has high oxidation resistance; its small molecular metabolites include acid, ethanol, butanedione, $H_2O_2$ and other metabolites, has strong metal ion complexing capability, and complexes with $Cu^{2+}$ to inhibit PPO activity, thus effectively inhibiting enzymatic browning.

Researches on PPO enzymatic characteristics in the apple show that the optimal PPO temperature is 40° C.; when the temperature is 30° C., the PPO activity is reduced, and the optimal pH value is 5.0; and when the pH was less than 4.0, the PPO activity is obviously decreased.

The tangxin apple is peeled by adopting an ultrahigh pressure water jet flow cutting technology, cut into slices with a thickness of 5 mm and inoculated for 15 min in 30° C. and 30% *Lactobacillus brevis* fermentation broth. PPO is a terminal oxidase with $Cu^{2+}$ as a prosthetic group, and *Lactobacillus brevis* and *Lactobacillus plantarum* are complexed with $Cu^{2+}$, leading to rapid oxygen consumption to generate organic acid and $CO_2$, quickly reduction of pH and creation of an approximate oxygen-free environment to effectively inhibit PPO activity while removing oxygen required in enzymatic browning, thereby effectively inhibiting browning. The brought *Lactobacillus brevis* can also produce multiple antibiotics and bacteriocins to inhibit microorganisms, and produce multiple functional substances so that the apple crispy chip has a higher nutritional value.

2. RF-Pulse Vacuum Dehumidification Plate Pre-Drying Combined with Differential Pressure Puffing Technology The frequency of vacuumizing combined RF is 30 MHz, and the power is 5 kW pulse. The apple slices are heated and dried intermittently by a dehumidification plate drying technology. The heating temperature of the heating plate is 45° C., and the intermittent alternating time is 2 min.

The differential pressure puffing after vacuum pulse pre-drying is based on the principle of "popcorn". When in puffing, the pretreated apple slices are heated by steam in a vacuum airtight environment so that the internal moisture is continuously evaporated to generate water vapor. When the pressure keeps rising, the temperature reaches 85-89° C. and the steam pressure reaches 0.3-0.4 MPa, the pressure is immediately reduced to −0.08 MPa, and the temperature is reduced to 75° C., which lasts for 1.5 h. The water inside the apple slices suddenly vaporizes and flashes so as to generate strong steam differential pressure, which can maintain nutritional ingredients, fresh flavor, complete dehydration, crisp taste, full shape and even puffing of apples.

Effects and advantages: vacuum environment reduces enzyme activity, and the product quality is not affected. The pulse RF is large in penetration capability and even in heating. At the same time, addition of maltodextrin can effectively solve the problem of adhesion in the process of drying due to the high sugar content of apple slices, improve the retention and uniformity of nutritional ingredients in the dried products, and significantly shorten the drying time by about 50%. When the differential pressure puffing operation temperature is too low, the puffing degree is low. The appearance and crispness of apple chips are poor. When the operation temperature is too high, burnt easily occurs. The organic combination of the two methods are organically combined to complement each other's advantages so as to overcome the problems of "hard core" and "coking" caused by RF-pulse and differential pressure puffing.

3. The Antibacterial and Antiseptic Technology of *Bacillus Subtilis* Antimicrobial Peptide

*Bacillus subtilis*, BNCC 189983. This *Bacillus subtilis* antimicrobial peptide, as a novel food preservative, has the advantages of no toxicity, no residues and no drug tolerance, is significant in antibacterial effect, short in production period and low in cost, and can reduce energy consumption in the process of cold chain transportation of food.

The apple crispy chips are sprayed with 1.2 g/L *Bacillus subtilis* antimicrobial peptide solution, aired for 5 min, and dried for 0.5 h in 40° C. hot air. Advantages and effects: the natural microbial preservative has a wide antibacterial spectrum, a short production cycle and no toxicity, and effective bacteriostasis and antiseptic effect.

The relevant detection data of apple chips are as follows:

(1) Polyphenol Oxidase PPO Activity

| Treatment | PPO activity (U/g) | | |
|---|---|---|---|
| | 0 min | 5 min | 15 min |
| Inoculate *lactobacillus brevis* and *lactobacillus pantarum* | 39.58 | 67.66 | 38.74 |
| Control group | 39.58 | 80.32 | 50.19 |

Inoculation of *Lactobacillus brevis* and *Lactobacillus plantarum* can inhibit PPO activity and browning.

(2) Colony Forming Unit of Apple Crispy Chips after Preservation for 3 Months

| Treatment | Colony forming unit (CFU/mL) |
|---|---|
| 1.2 g/L *bacillus subtilis* antibacterial peptide | $2.89 \times 10^2$ |
| Control group | $8.16 \times 10^4$ |

Inoculation is performed with *Bacillus subtilis* antimicrobial peptide, so as to obviously inhibit the increase in the number of bacteria.

(3) Sensory Qualities of Products after Preservation for 3 Months

| Index | | Scores |
|---|---|---|
| Color (10 ccores) | Uniform color, bright-colored, no burnt | 8.5 |
| Fragrance (10 scores) | Strong fragrance, no other bad smell that does not conform to the product | 8 |
| Taste (10 scores) | Good taste, no peculiar smell | 8.5 |
| Hardness (10 scores) | Refresh and no adhering to teeth | 8 |

Note:
the full score of each index is 10 scores.

After preservation for 3 months, the sensory quality of the product is good.

What is claimed is:

1. A method for processing non-fried apple crispy chips, the method comprising the following process steps:
   (1) screening fresh and high-quality tangxin apples without disease and pest infringement and mechanical damage and with substantially the same fruit maturity, washing and peeling;
   (2) cutting the apple into slices with a thickness of 5 mm by using an ultrahigh pressure water jet cutting technology; soaking the slices in a 30° C. fermentation broth containing 30% *lactobacillus brevis* for 15 min to prevent browning of the slices;

(3) spraying apple chips with *Bacillus subtilis* antimicrobial peptide solution, airing for 5 min and drying for 0.5 h in 40° C. hot air, (4) soaking the apple slices for 10 min with 5-10 wt % maltodextrin solution before drying, draining and then drying with a pulse vacuum drying machine; wherein in the drying process, a frequency of vacuumizing combined RF of the pulse vacuum drying machine is 30 MHz, a RF power is 5 kW pulse, a heating temperature is 45° C., and an intermittent time for the pulse vacuum drying machine performing the drying is 2 min; and (5) puffing the apple slices; wherein in puffing, the apple slices are heated by steam in a vacuum airtight environment to evaporate an internal moisture of the apple slices; a temperature reaches 85-89° C. and a steam pressure reaches 0.3-0.4 MPa; then the steam pressure is immediately reduced to −0.08 MPa, and the temperature is reduced to 75° C., which are maintained for 1.5 h.

2. The method for processing non-fried apple crispy chips according to claim 1, wherein the concentration of the *Bacillus subtilis* antimicrobial peptide solution is 1.2 g/L.

3. The method for processing non-fried apple crispy chips according to claim 1, wherein the apple chip is uniformly sprayed with 1.2 g/L *Bacillus subtilis* antimicrobial peptide solution.

\* \* \* \* \*